United States Patent
Wanjek et al.

(10) Patent No.: US 11,888,517 B2
(45) Date of Patent: Jan. 30, 2024

(54) METHOD FOR A DATA TRANSMISSION BETWEEN A FIRST AND A SECOND MODULE AND SYSTEM INCLUDING MOBILE PARTS FOR CARRYING OUT THE METHOD

(71) Applicant: SEW-EURODRIVE GMBH & CO. KG, Bruchsal (DE)

(72) Inventors: Andreas Wanjek, Waghäusel (DE); Steffen Storck, Bruchsal (DE); Zhidong Hua, Bruchsal (DE); Thomas Schäfer, Karlsdorf-Neuthard (DE); Josef Schmidt, Graben-Neudorf (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 221 days.

(21) Appl. No.: 17/606,211

(22) PCT Filed: Apr. 2, 2020

(86) PCT No.: PCT/EP2020/025158
§ 371 (c)(1),
(2) Date: Oct. 25, 2021

(87) PCT Pub. No.: WO2020/216468
PCT Pub. Date: Oct. 29, 2020

(65) Prior Publication Data
US 2022/0247490 A1    Aug. 4, 2022

(30) Foreign Application Priority Data
Apr. 25, 2019 (DE) .......................... 102019002958.5

(51) Int. Cl.
*H04B 10/114* (2013.01)
(52) U.S. Cl.
CPC ............................. *H04B 10/1143* (2013.01)

(58) Field of Classification Search
CPC ............ H04B 10/1143; H04B 10/1149; H04B 10/116
(Continued)

(56) References Cited

U.S. PATENT DOCUMENTS

| 10,054,665 | B2 | 8/2018 | Feil | |
|---|---|---|---|---|
| 10,236,986 | B1 * | 3/2019 | Shatz | .................. H04B 10/516 |

(Continued)

FOREIGN PATENT DOCUMENTS

| DE | 60100824 T2 | 7/2004 |
|---|---|---|
| DE | 102015205220 A1 | 9/2016 |
| WO | 2009010916 A2 | 1/2009 |

OTHER PUBLICATIONS

International Search Report issued in corresponding International Application No. PCT/EP2020/025158, dated Aug. 3, 2020, pp. 1-2, English Translation.

*Primary Examiner* — Abbas H Alagheband
(74) *Attorney, Agent, or Firm* — CARTER, DELUCA & FARRELL LLP

(57) ABSTRACT

In a method for a data transmission between first and second modules, and a system having mobile parts for performing the method: the time bases of the first and second modules are synchronized; transmitters of the first module emit a light signal pulse individually one after the other and/or in numbered order in a respective time range; the particular receiver of the second module at which the strongest receive signal occurs is determined, the particular time range and/or the number of the particular time range being determined in which the strongest receive signal occurs; the determined time range and/or the determined number is/are transmitted from the second module to the first module; and the transmitter of the first module associated with the determined time range and/or to the determined number is determined (Continued)

and used for the subsequent data transmission from the first module to the second module.

23 Claims, 2 Drawing Sheets

(58) Field of Classification Search
USPC .......................................................... 398/131
See application file for complete search history.

(56) References Cited

U.S. PATENT DOCUMENTS

| | | | |
|---|---|---|---|
| 11,575,433 B1* | 2/2023 | Chaffee | H04B 10/524 |
| 2008/0131134 A1* | 6/2008 | Dreischer | H04L 5/1469 |
| | | | 398/128 |
| 2008/0273587 A1* | 11/2008 | Irle | G01D 5/246 |
| | | | 375/238 |
| 2009/0022496 A1 | 1/2009 | Shin et al. | |
| 2009/0316679 A1* | 12/2009 | Van Der Wateren | ........................ |
| | | | H04W 72/535 |
| | | | 370/347 |
| 2011/0069971 A1* | 3/2011 | Kim | H04B 10/1149 |
| | | | 398/172 |
| 2017/0195049 A1* | 7/2017 | Shatz | H04N 23/62 |
| 2018/0217229 A1* | 8/2018 | Shukla | G01S 17/42 |
| 2019/0187242 A1* | 6/2019 | Shukla | G01S 17/87 |
| 2020/0195344 A1* | 6/2020 | Jungnickel | H04L 5/0026 |
| 2021/0184776 A1* | 6/2021 | Vazzana | H04B 10/616 |
| 2022/0247490 A1* | 8/2022 | Wanjek | H04B 10/1149 |

* cited by examiner

METHOD FOR A DATA TRANSMISSION BETWEEN A FIRST AND A SECOND MODULE AND SYSTEM INCLUDING MOBILE PARTS FOR CARRYING OUT THE METHOD

FIELD OF THE INVENTION

The present invention relates to a method for a data transmission between a first and a second module and to a system that includes mobile parts for carrying out the present method.

BACKGROUND INFORMATION

In certain conventional systems, a receiver receives the signal from a transmitter for a data transmission.

U.S. Patent Application Publication No. 2011/0069971 describes a method for a data transmission using visible light.

German Patent Document No. 601 00 824 describes a method for a transmission signal adjustment in an optical free space transmission system.

German Patent Document No. 10 2015 205 220 describes a tracking system for tracking a carrier of a mobile communications unit.

U.S. Patent Application Publication No. 2009/0022499 describes a method for setting up a communications connection using visible light.

U.S. Patent Application Publication No. 2009/0316679 describes a wireless broadcast network.

SUMMARY

Example embodiments of the present invention provide for a data transmission that features low interference and/or a low error rate.

According to an example embodiment of the present invention, in a method for a data transmission between a first and a second module, the first module has transmitters, e.g., for light, and, e.g., light-sensitive receivers, and the second module has transmitters, e.g., for light, and, e.g., light-sensitive receivers. In a first method step, the time basis of the first module is synchronized with the time basis of the second module. In a second method step, the transmitters of the first module emit a light signal pulse individually one after the other and/or in numbered order in a respective time range, e.g., time slot. The respective receiver of the second module is determined at which the strongest receive signal occurs, e.g., by a control electronics of the second module, e.g., while executing the second method step, and the particular time range, e.g., time slot, and/or the number of the particular time range is/are determined in which the strongest receive signal occurs. In a third method step, the determined time range and/or the determined number is/are transmitted from the second module to the first module. In a fourth method step, the transmitter of the first module associated with the determined time range and/or the determined number is determined, e.g., by a control electronics of the first module, and used for the subsequent data transmission from the first module to the second module. At least the second, third, and fourth method steps, for example, are carried out in a recurrent manner over time.

This has the advantage that a data transmission that has minimal interference and noise is achievable. This is because the use of transmitters that emit light, e.g., more strongly in a preferred direction than in another direction, and the use of receivers that likewise have a preferred direction in their sensitive range allows for a directional transmission of signals. Light-emitting interference transmitters are thus suppressed, provided they are not situated in the used transmission space region that includes the connecting line between transmitter and receiver. In addition, the particular transmitter of the first module and the particular receiver of the second module that allow for a signal transmission featuring an optimal signal-to-noise ratio are selected in a recurring manner over time. This selected pair induces the greatest receive amplitude in the receiver, i.e., the best signal-to-noise ratio. The connecting line between the transmitter and the receiver of the pair extends at least substantially in parallel with the preferred direction of the transmitter and with the preferred direction of the receiver. Since a movement of the mobile parts changes the orientation of the modules relative to one another and thus the deviation of the preferred direction from the direction of the connecting line, the pair is always determined anew in a recurrent manner over time.

According to example embodiments: In a fifth method step, the transmitters of the second module emit, individually one after the other and/or in numbered order, a light signal pulse in a respective time range, in particular time slot; the respective receiver of the first module is determined in which the strongest receive signal occurs, e.g., while the fifth method step is executed, and the particular time range, e.g., time slot, and/or the number of the particular time range in which the strongest receive signal occurs is/are determined; then, in a sixth method step, the determined time range and/or the determined number is/are transmitted from the first module to the second module; next, in a seventh method step, the transmitter of the second module associated with the determined time range and/or the determined number is determined and used for the subsequent data transmission from the second module to the first module. At least the fifth, sixth, and seventh method steps are, for example, carried out in a recurrent manner over time. This offers the advantage that a transmission that is similarly low in interference can be set up also for the return channel because here, too, the particular pair that allows for the best signal-to-noise ratio is able to be selected.

According to example embodiments, the transmitters of the first module have a preferred direction for the light they emit and are situated with different, and thus, for example, non-parallel, orientations. For example, the light cones emitted by the transmitters of the first module are not aligned in parallel. The transmitters of the second module have a preferred direction for the light they emit and are situated with different, e.g., non-parallel, orientations. For example, the light cones radiated by the transmitters of the second module are not aligned in parallel. This offers the advantage that interfering light sources can be suppressed. This is because the communications channel requires only a limited space region.

According to example embodiments, a message is transmitted after the fourth and/or after the seventh method step. This has the advantage that the transmitter and receiver pairs having the best signal-to-noise ratio and messages are selected, which means that messages are transmittable in a manner that is low in errors and safe from interference.

According to example embodiments, the transmitters are arranged as LEDs and the receivers are arranged as a light-sensitive component, e.g., a photo transistor or a photodiode. This has the advantage that a directional transmission of light may be carried out and also a receiving with a preferred direction.

According to example embodiments, the second module is located within the transmission range of at least one transmitter of the first module, and the first module is located within the transmission range of at least one transmitter of the second module. This offers the advantage that a message transmission is able to be carried out.

According to example embodiments, the light signal pulses emitted by the transmitters in the second method step are all modulated in the same manner so that each light signal pulse includes the same message. This offers the advantage that on the one hand, the training sequence carried out in the second method step makes it possible to determine the pair having the best signal-to-noise ratio and that on the other hand, a message is still transmittable during this time. It is disadvantageous that each transmitter of the first module consecutively emits the same light signal pulse onto which the same message is modulated. The data transmission rate during the training sequence is therefore lower than in the usual data transmission. Thus, the more transmitters the first module has and the shorter the light signal pulses, the lower the data transmission rate.

However, if the first module has only four transmitters, for example, and the light signal pulse takes up nearly a fourth of the total duration of the training sequence, that is to say, of the second method step, then a data transmission rate that is slightly lower than one-fourth the other data transmission rate is still achievable. Given N transmitters, a data transmission rate is therefore achievable that is slightly lower than the Nth part of the other data transmission rate.

According to an example embodiment of the present invention, in a system having mobile parts for carrying out the method described herein, each one of the mobile parts has at least one module provided with transmitters, e.g., for light, and, e.g., light-sensitive receivers, the transmitters and receivers of the respective module, e.g., being connected to a control electronics of the respective mobile part.

This has the advantage that the mobile part is able to transmit messages to the other mobile part and a mutually influenced operation can thus be carried out. On the one hand, this makes it possible to avoid a collision and on the other hand, it is possible to jointly carry out an intralogistics transport task. Information is transmittable in addition. Because of the directional transmission, however, messages can also be forwarded from a first mobile part via a second mobile part to a third mobile part, even if no communications link exists between the first and the third mobile parts. It is therefore also possible to send messages to mobile parts that are located at a great distance or to send messages to mobile parts to which no direct, i.e., straight, line of sight exists. A low-noise communication around an obstacle is enabled as a result.

According to example embodiments, the mobile parts are able to be moved on a driving surface of the system and each one of the modules has the same distance from the driving surface. This offers the advantage that the message transmission can be carried out in a defined plane or surface that has a constant distance from the driving surface.

According to example embodiments, the transmitters of each module are situated along a flat bent curve, and the light cones emitted by the transmitters have a different orientation. This has the advantage that a large solid angle range is able to be covered even when using transmitters that emit narrow radiation, i.e., emit into a small solid angle.

According to example embodiments, no signal transmission is able to take place between a first and a third mobile part, e.g., because of an interposed obstacle and/or an excessive distance. A data transmission is carried out between the first and a second mobile part and between the second and the third mobile part. The method described herein is carried out between the modules of the first and second mobile part, and the method is carried out between the modules of the second and third mobile part. This has the advantage that if the distance is too great or if obstacles are interposed, bridging for light is possible with the aid of an interposed second mobile part which has two modules, so that the information received by the first one of the two modules from a module of the first mobile part is able to be transmitted further to the third mobile part, e.g., its module, with the aid of the second of the two modules of the second mobile part.

Further features and aspects of example embodiments of the present invention are described in greater detail below with reference to the appended schematic Figures

DETAILED DESCRIPTION

As schematically illustrated in the Figures, first module 1 has four transmitters, e.g., LEDs, whose emittable light cone is aligned in different directions.

Assigned to each transmitter is a respective receiver, e.g., a photodiode or photo transistor, whose sensitive range has a shape similar to the corresponding light cone and thus also has a preferred direction. In the simplest case, the preferential direction of the light cone of the respective transmitter is parallel to the preferred direction of the respective receiver.

The transmitters are, for example, situated along a flat curve, e.g., a circular path, and are set apart from one another at regular intervals along this curve.

The arrangement of second module 4 is, for example, identical with that of first module 1.

First module 1 is situated on a first mobile part 12a and second module 4 is situated on a second mobile part 21b, which moves independently, e.g., in an automatically guided manner, relative to the first mobile part 12a in a system.

To carry out the communication, the best transmission channel is determined in a recurrent manner over time in that the transmitters of first module 1 emit light pulses and the respective receiver that detects the greatest receive amplitude is determined. Thus, a transmission channel is set up between this receiver and the strongest transmitter for this receiver. This determination and setup are repeated in time.

This is described in greater detail in the following text.

In a chronologically deterministic raster, signals are transmitted from first module 1 and received by second module 4, or vice versa.

To this end, a training signal characteristic is appended to a respective message, characterized by time range t_TX_DATA.

The training signal includes four consecutive time segments, e.g., time slots, and another LED of first module 1 emits a light signal pulse in each one of the time slots. The energy and time period of each of the light pulse signals are of the same magnitude.

Figure 1:
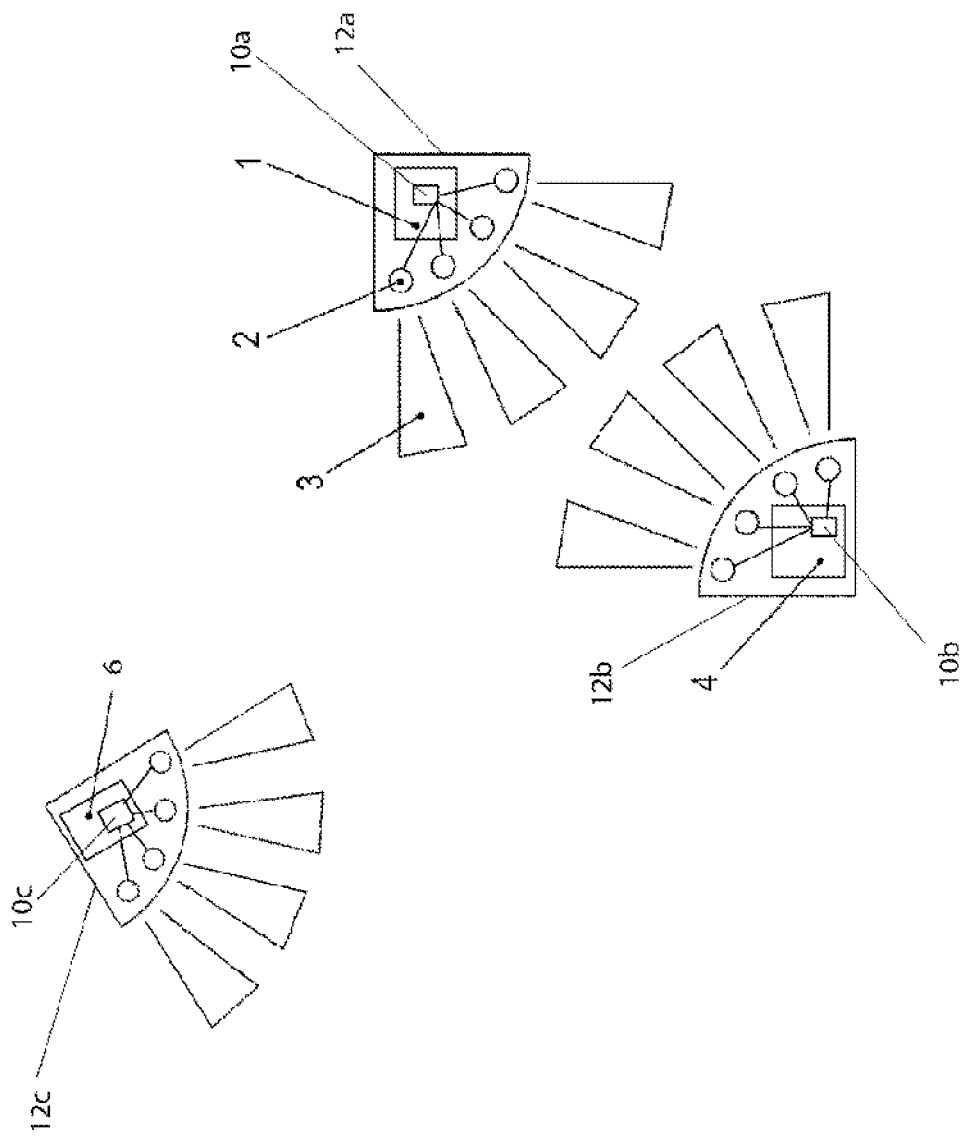
FIG. 1 schematically illustrates a first module 1 and a, e.g., identically configured second module 4.

According to FIG. 1, a first transmitter of first module 1 thus emits a light signal pulse in a first time slot t_int1, a second transmitter of first module 1 emits a light signal pulse in a second time slot t_int2, a third transmitter of first module 1 emits a light signal pulse in a third time slot t_int1, and a fourth transmitter of first module 1 emits a light signal pulse in a fourth time slot t_int4.

Figure 2:
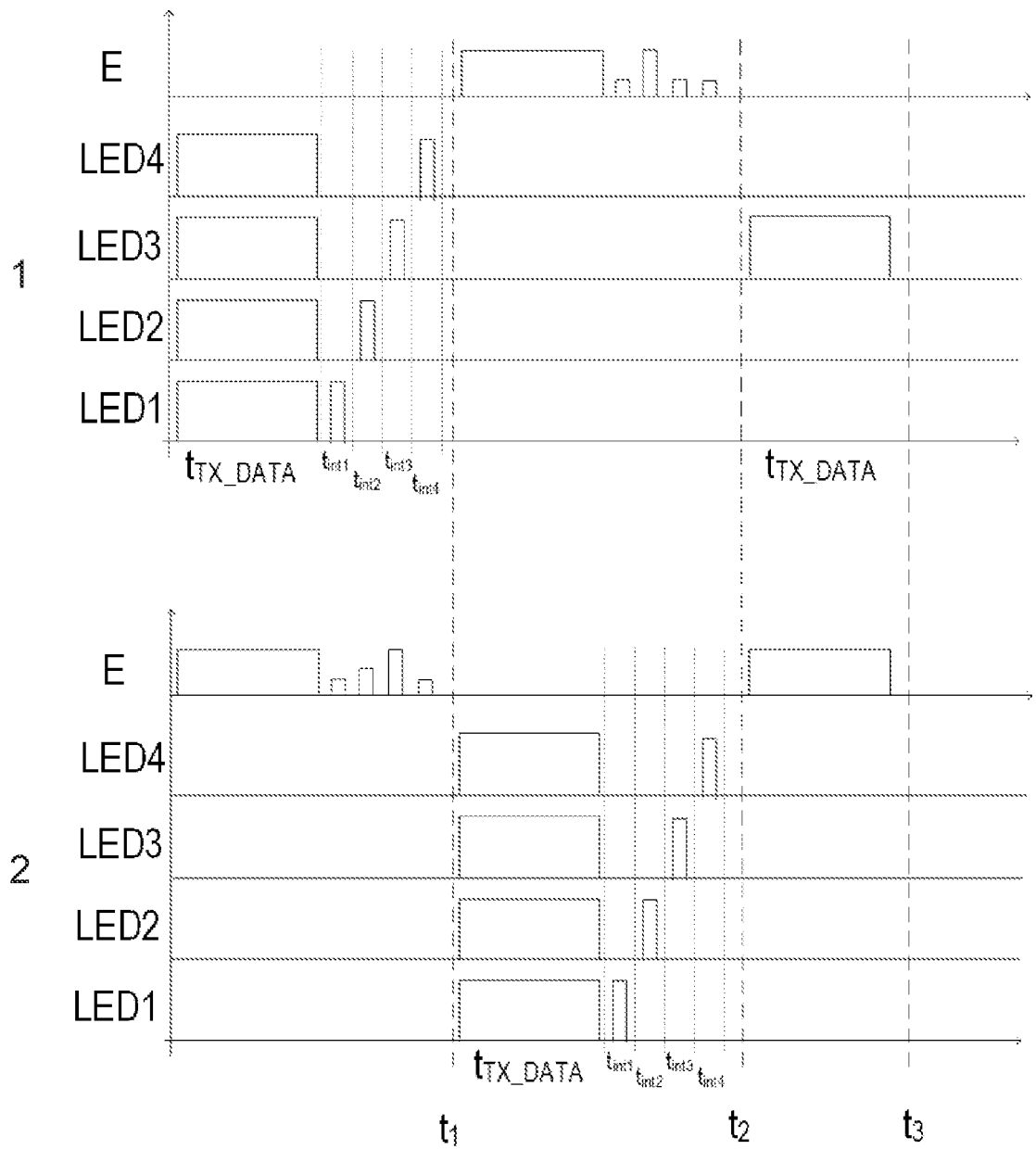
FIG. 2 illustrates the transmitted and received signal characteristics in a schematic representation.

Signal E received by one of the receivers of second module 4 is illustrated in FIG. 2 and exhibits a maximum in the third light signal pulse. The setup of a communications channel between the third transmitter and the receiver would therefore be possible. However, the receive signals of the other receivers of second module 4 are evaluated as well. The communications channel is then set up between the third transmitter and the particular receiver that has received the strongest signal. If need be, a different transmitter is used instead of the third transmitter if it has induced a stronger signal in one of the receivers.

Put another way, the particular transmitter-receiver pair that is able to generate the strongest receive signal is determined.

As illustrated in FIG. 2, the first message packet that is sent from first module 1 to second module 4 is therefore followed by a first training signal with the four light signal pulses of the transmitters of first module 1.

In the process, the particular receiver whose receive signal had the highest amplitude is determined. The transmitter associated with this highest amplitude is then determined, which is the third transmitter in FIG. 2, and this information pertaining to the identity of the associated transmitter, i.e., the third transmitter, is transmitted to first module 1 in the next message packet that is sent from the second to the first module 1.

The corresponding communications channel for the transmission of the messages from the first to the second module is set up in this manner. In the example, the third transmitter of first module 1 and the determined receiver of second module 4 are thus used for the message transmission from the first to the second module.

The pair to be used for the return channel is determined next:

To this end, second module 4 also emits a training signal, which includes the light signal pulses to be sent individually by the transmitters.

Now, the particular receiver of first module 1 that has received the strongest amplitude may then be determined again in this manner. At the same time, the particular transmitter of second module 4 that has emitted this strongest signal is able to be determined in the process.

The best transmitter-receiver pair is thereby also determined for the return channel.

In the example, this is the second transmitter of second module 4 and the particular receiver of first module 1 that detects the strongest receive signal.

The pairs determined in this manner are used for the subsequent transmission of the messages until the currently best transmitter-receiver pairs are determined again with the aid of training signals.

Only the determined transmitters and receivers are used when transmitting the messages. The other transmitters and receivers remain unused. Interference effects on other mobile parts or from other mobile parts are preventable as a result. This is because only the particular light cone 3 that has been generated by the transmitter and is directed toward the receiver of the other module (1, 4) is used for the message transmittal. The transmitter thus radiates into as few other spatial areas as possible in which further modules of other mobile parts are being moved, for example.

In further exemplary embodiments, the light signal pulses themselves are also modulated so that the same message is transmitted by each one of the light signal pulse signals in the training signal characteristic, but, e.g., into different preferred directions. The receivers thus receive this message with more or less noise depending on the receive amplitude. However, after the strongest receive signal has been determined, even the message transmitted with this particular signal can be detected with few errors.

In further exemplary embodiments, each transmitted message is followed by a training signal so that an optimal updating takes place when the currently best transmitter-receiver pairs are determined.

As noted above, in a system having mobile parts 12a, 12b, 12c for carrying out the method described herein, each one of the mobile parts 12a, 12b, 12c has at least one module provided 1, 4, 6 with transmitters, e.g., for light, and, e.g., light-sensitive receivers, the transmitters and receivers of the respective module, e.g., being connected to a control electronics 10a, 10b, 10c of the respective mobile part. As further noted above, the transmitter of the first module associated with the determined time range and/or the determined number is determined, e.g., by a control electronics 10a of the first module, and used for the subsequent data transmission from the first module to the second module.

The invention claimed is:

1. A method for a data transmission between a first module and a second module, the first module including transmitters, the second module including transmitters, a time basis of the first module being synchronized with a time basis of the second module, comprising:
    (b) emitting, by the transmitters of the first module, a light signal pulse individually in a sequence in a respective time range;
    (c) determining a particular receiver of the second module at which a strongest received signal occurs and determining a particular time range and/or a number of the particular time range in which the strongest received signal occurs;
    (d) transmitting information corresponding to the determined time range and/or corresponding to the determined number from the second module to the first module; and
    (e) determining which particular transmitter of the first module is associated with the determined time range and/or the determined number and using the determined particular transmitter of the first module for subsequent data transmission from the first module to the second module.

2. The method according to claim 1, wherein the transmitters of the first and second modules are arranged as light transmitters, the first module includes light-sensitive receivers, and the second modules include light-sensitive receivers.

3. The method according to claim 2, wherein the transmitters include LEDs and the receivers include a light-sensitive component, a photo transistor, and/or a photodiode.

4. The method according to claim 1, wherein the time range includes a time slot.

5. The method according to claim 1, wherein the determining in (c) is performed by a control electronics of the second module while executing the emitting in (b).

6. The method according to claim 1, wherein the determining in (e) is performed by a control electronics of the first module.

7. The method according to claim 1, wherein at least the emitting in (b), the determining in (d), and the determining in (e) are performed recurrently over time.

8. The method according to claim 1, further comprising:
(f) emitting, by the transmitters of the second module, a light signal pulse individually one after the other and/or in numbered order in a respective time range;
(g) determining a respective receiver of the first module at which a strongest received signal occurs and determining a particular time range and/or a number of the particular time range in which the strongest received signal occurs;
(h) transmitting the determined time range and/or the determined number from the first module to the second module; and
(i) determining the transmitter of the second module associated with the determined time range and/or the determined number and using the determined transmitter of the second module for subsequent data transmission from the second module to the first module.

9. The method according to claim 8, wherein the emitting in (f), the transmitting in (h), and the determining in (i) are performed recurrently over time.

10. The method according to claim 8, wherein the determining in (g) is performed while executing the emitting (f).

11. The method according to claim 8, further comprising transmitting a message after the determining in (e) and/or after the determining in (i).

12. The method according to claim 1, wherein the transmitters of the first module have a preferred direction for light emitted thereby and are arranged with different and non-parallel orientations, light cones emitted by the transmitters of the first module not being aligned in parallel, the transmitters of the second module have a preferred direction for light emitted thereby and are arranged with different and non-parallel orientations, light cones emitted by the transmitters of the second module not being aligned in parallel.

13. The method according to claim 1, further comprising transmitting a message after the determining in (e).

14. The method according to claim 1, wherein the second module is located within a transmission range of at least one transmitter of the first module, and the first module is located within a transmission range of at least one transmitter of the second module.

15. The method according to claim 1, wherein light signal pulses emitted by the transmitters in (b) are all modulated in the same manner so that each light signal pulse includes a same message.

16. A system adapted to perform the method recited in claim 1, comprising:
a plurality of mobile parts, each mobile part including at least one module, each module including a control electronics, transmitters connected to the control electronics of the module, and receivers connected to the control electronics of the module.

17. The system according to claim 16, wherein the transmitters are arranged as light transmitters, and the receivers are arranged as light sensitive receivers.

18. The system according to claim 16, wherein the mobile parts are adapted to be moved on a driving surface of the system, and each module has a same distance from the driving surface.

19. The system according to claim 16, wherein the transmitters of each module are arranged along a flat, bent curve and are adapted to emit light cones having different orientations.

20. The system according to claim 16, wherein a first one of the mobile parts and a third one of the mobile parts are arranged so that no signal transmission is performable between the first one of the mobile parts and the third one of the mobile parts, the first one of the mobile parts and a second one of the mobile parts being arranged to perform a data transmission between the first one of the mobile parts and the second one of the mobile parts, the second one of the mobile parts and the third one of the mobile parts being arranged to perform a data transmission between the second one of the mobile parts and the third one of the mobile parts.

21. The system according to claim 20, wherein the first one of the mobile parts, the second one of the mobile parts, and the third one of the mobile parts are adapted to perform the method recited in claim 1 between the modules of the first one of the mobile parts and the second one of the mobile parts and between the modules of the second one of the mobile parts and the third one of the mobile parts.

22. The system according to claim 20, wherein an obstacle interposed between the first one of the mobile parts and the third one of the mobile parts and/or and excessive distance between the first one of the mobile parts and the third one of the mobile parts prevents the signal transmission between the first one of the mobile parts and the third one of the mobile parts.

23. A system, comprising:
a plurality of mobile parts, each mobile part including at least one module, each module including a control electronics, transmitters connected to the control electronics of the module, and receivers connected to the control electronics of the module;
wherein the system is adapted to perform the method recited in claim 1.

* * * * *